(12) United States Patent
Sakuramoto et al.

(10) Patent No.: US 11,673,258 B2
(45) Date of Patent: Jun. 13, 2023

(54) MODULAR ROBOTIC DEVICE AND METHOD TO OPERATE A MODULAR ROBOTIC DEVICE

(71) Applicant: GM GLOBAL TECHNOLOGY OPERATIONS LLC, Detroit, MI (US)

(72) Inventors: Carlos Y. Sakuramoto, Sao Paulo (BR); Saulo Melotti, Santa Catarina (BR); Fabiano Preisler, Florianópolis (BR); Gustavo R. Ascenção, Berlin (DE); Douglas Negri, Santa Catarina (BR)

(73) Assignee: GM Global Technology Operations LLC, Detroit, MI (US)

( * ) Notice: Subject to any disclaimer, the term of this patent is extended or adjusted under 35 U.S.C. 154(b) by 242 days.

(21) Appl. No.: 17/148,022

(22) Filed: Jan. 13, 2021

(65) Prior Publication Data
US 2022/0219316 A1 Jul. 14, 2022

(51) Int. Cl.
*B25J 9/06* (2006.01)
*B25J 9/08* (2006.01)
*B25J 9/16* (2006.01)

(52) U.S. Cl.
CPC . *B25J 9/08* (2013.01); *B25J 9/06* (2013.01); *B25J 9/1605* (2013.01)

(58) Field of Classification Search
CPC .............. B25J 9/08; B25J 9/06; B25J 9/1605
See application file for complete search history.

(56) References Cited

U.S. PATENT DOCUMENTS

| | | | |
|---|---|---|---|
| 5,428,713 A * | 6/1995 | Matsumaru | B25J 9/1615 700/262 |
| 6,084,373 A * | 7/2000 | Goldenberg | B25J 9/08 901/23 |
| 2010/0292836 A1* | 11/2010 | Cheung | B25J 9/1617 700/245 |
| 2011/0172818 A1* | 7/2011 | Kim | B25J 9/1666 901/2 |
| 2017/0259436 A1* | 9/2017 | Nakayama | B25J 19/0029 |
| 2017/0361458 A1* | 12/2017 | Johnson | B25J 9/0009 |
| 2019/0262988 A1* | 8/2019 | Guo | B25J 9/1617 |
| 2020/0086479 A1* | 3/2020 | Messier | G01L 5/226 |
| 2020/0086504 A1* | 3/2020 | Caron L'Ecuyer | F16B 2/06 |
| 2020/0361080 A1* | 11/2020 | Bergeron | B25J 9/08 |

FOREIGN PATENT DOCUMENTS

JP 2021084218 A * 6/2021

* cited by examiner

*Primary Examiner* — Dale Moyer
(74) *Attorney, Agent, or Firm* — Quinn IP Law

(57) ABSTRACT

A modular robotic device is provided. The modular robotic device includes a robot base and a robotic manipulator connected to the robot base and operable to articulate a tool device connected to an end of the robotic manipulator. The robotic manipulator includes a plurality of modular rigid segments, wherein each of the plurality of modular rigid segments includes a joint portion and each operable to be selectably connected to the robotic manipulator. The plurality of modular rigid segments is interchangeable and operable to be assembled in various combinations.

12 Claims, 19 Drawing Sheets

MODULAR ROBOTIC DEVICE AND METHOD TO OPERATE A MODULAR ROBOTIC DEVICE

INTRODUCTION

The disclosure generally relates to a modular robotic device and a method to operate a modular robotic device.

Robotic arms are useful to perform a multitude of tasks. In one embodiment, a robotic arm may be useful in a manufacturing setting, with the robotic arm performing one or more tasks upon a product being manufactured. An exemplary robotic arm may include a paint nozzle, a welding attachment, or a drill attachment.

Products being manufactured may be relatively large or relatively small, with varying degrees of complexity in the product being manufactured. In an example, a motor vehicle may include thousands of parts assembled to a vehicle body or a vehicle chassis. A robotic arm may be tasked to install a fuse box near an in-vehicle brake pedal, wherein the robotic arm may enter through an open window, navigate around the seat and steering wheel, and adjust an angle and rotation of the fuse box to match the in-vehicle location and orientation in which it is to be installed. The robotic arm may include an ability to articulate or may include a useful number of degrees-of-freedom to accomplish a desired task.

SUMMARY

A modular robotic device is provided. The modular robotic device includes a robot base and a robotic manipulator connected to the robot base and operable to articulate a tool device connected to an end of the robotic manipulator. The robotic manipulator includes a plurality of modular rigid segments, wherein each of the plurality of modular rigid segments includes a joint portion and each operable to be selectably connected to the robotic manipulator. The plurality of modular rigid segments is interchangeable and operable to be assembled in various combinations.

In some embodiments, the plurality of modular rigid segments includes a first rigid segment including a first joint portion. The plurality of modular rigid segments further includes a second rigid segment connected to the first joint portion and includes a second joint portion connected to the second rigid segment. The plurality of modular rigid segments further includes a third rigid segment connected to the second joint portion and includes a third joint portion connected to the third rigid segment. The plurality of modular rigid segments further includes a fourth rigid segment connected to the third joint portion and includes a fourth joint portion connected to the fourth rigid segment. The plurality of modular rigid segments further includes a fifth rigid segment connected to the fourth joint portion and includes a fifth joint portion connected to the fifth rigid segment. The plurality of modular rigid segments further includes a sixth rigid segment connected to the fifth joint portion and includes a sixth joint portion connected to the sixth rigid segment. The plurality of modular rigid segments further includes a seventh rigid segment connected to the sixth joint portion.

In some embodiments, each of the modular rigid segments includes a connection cable operable to transmit one of data and power through the modular rigid segment.

In some embodiments, each of the modular rigid segments includes connection cables operable to transmit data and power through the modular rigid segment.

In some embodiments, at least one of the joint portions is operable to change an angle of a longitudinal axis of a first of the plurality of modular rigid segments with respect to a longitudinal axis of a second of the plurality of modular rigid segments.

In some embodiments, at least one of the joint portions is operable to rotate a first of the plurality of modular rigid segments with respect to a second of the plurality of modular rigid segments while maintaining a common longitudinal axis between the first of the plurality of modular rigid segments and the second of the plurality of modular rigid segments.

In some embodiments, the robot base is mobile and operable to move alongside a moving workpiece upon which the robotic device is operable to perform work such that the robotic manipulator may perform a task upon the moving workpiece.

In some embodiments, the modular robotic device further includes a computerized control system including programming to model operation of the robotic manipulator in a context of a workpiece upon which the robotic device is operable to perform work and generate a determined minimum number of degrees of freedom useful to operate the robotic manipulator in the context of the workpiece. The robotic manipulator is operable to include the determined minimum number of degrees of freedom.

In some embodiments, modeling operation of the robotic manipulator includes defining a plurality of states including an initial state, one or more intermediate states, and a final state through which the robotic manipulator may transition to complete an operation upon the workpiece.

According to an alternative embodiment, a modular robotic device is disclosed. The modular robotic device includes a robot base and a robotic manipulator connected to the robot base and operable to articulate a tool device connected to an end of the robotic manipulator. The robotic manipulator includes a plurality of modular rigid segments each including a joint portion and each operable to be selectably connected to and disconnected from the robotic manipulator. The modular robotic device further includes a computerized control system including programming to model operation of the robotic manipulator in a context of a workpiece upon which the robotic device is operable to perform work and generate a determined minimum number of degrees of freedom useful to operate the robotic manipulator in the context of the workpiece. Each of the modular rigid segments includes a connection cable operable to transmit one of data and power through the modular rigid segment. The robotic manipulator is operable to include the determined minimum number of degrees of freedom. The plurality of modular rigid segments is interchangeable and operable to be assembled in various combinations.

In some embodiments, each of the modular rigid segments includes connection cables operable to transmit data and power through the modular rigid segment.

In some embodiments, at least one of the joint portions is operable to change an angle of a longitudinal axis of a first of the plurality of modular rigid segments with respect to a longitudinal axis of a second of the plurality of modular rigid segments. At least one of the joint portions is operable to rotate a first of the plurality of modular rigid segments with respect to a second of the plurality of modular rigid segments while maintaining a common longitudinal axis between the first of the plurality of modular rigid segments and the second of the plurality of modular rigid segments.

In some embodiments, the robot base is mobile and operable to move alongside a moving workpiece upon which the robotic device is operable to perform work such that the robotic manipulator may perform a task upon the moving workpiece.

In some embodiments, modeling operation of the robotic manipulator includes defining a plurality of states including an initial state, one or more intermediate states, and a final state through which the robotic manipulator may transition to complete an operation upon the workpiece.

According to one alternative embodiment, a method to operate a modular robotic device is disclosed. The method includes, within a computerized processor, operating programming to monitor geometry and restraints describing a workpiece and operations to be performed upon the workpiece and determine a plurality of states through which the modular robotic device may be moved to accomplish the operations to be performed based upon the monitored geometry and restraints. The method further includes, within the computerized processor, operating programming to analyze the plurality of states to determine a minimum number of degrees of freedom in a robotic manipulator of the modular robotic device and generate a recommended robotic manipulator configuration including a number of rigid segments to be used and types of joint portions to be used.

In some embodiments, the method further includes assembling a plurality of modular rigid segments, each of the plurality of modular rigid segments including a joint portion, to a robot base based upon the recommended robotic manipulator configuration.

In some embodiments, generating the recommended robotic manipulator configuration including types of joint portions to be used includes determining operations including bending of a robotic manipulator of the modular robotic device and determining operations including rotating of the robotic manipulator.

The above features and advantages and other features and advantages of the present disclosure are readily apparent from the following detailed description of the best modes for carrying out the disclosure when taken in connection with the accompanying drawings.

DETAILED DESCRIPTION

A system and method for a multi-degree-of-freedom, flexible, and modular snake robot arm is provided. A manufacturing method may include a set of defined constraints. Based upon these defined constraints, a minimum number of degrees-of-freedom for a robotic arm to accomplish the manufacturing method may be defined. Based upon the defined constraints and the minimum number of degrees-of-freedom, a robotic arm may be selected to achieve the manufacturing method.

A robotic arm may include a first segment including a first rigid section and a second segment including a second rigid section. A joint may be used to join the first segment to the second segment. The joint may include a bending hinge portion, which enables the second segment to change an angle with respect to the first segment. A bending hinge portion may be compared to an elbow joint in a person and may include operation in a single plane, where the segment being manipulated may change an angle of the second segment about a fixed axis or with a single degree-of-freedom. The joint may alternatively include a rotating portion, wherein the second segment may be rotated about a fixed axis that is coincident with a longitudinal axis of the first segment or with a single degree-of-freedom. The joint may alternatively include a two degree-of-freedom gimbal portion, similar to a shoulder joint in a person, which enables the second segment to change angles about two axes with respect to the first segment. The robotic devices disclosed herein may be modular, meaning that based upon the particulars of an assigned work task, the robot may be selectively built upon, with additional modular rigid segments and joint portions may be added or removed as needed. The robotic device may operate similarly independently of a number of modular rigid segments attached, with each additional modular rigid segment increasing a number of degrees of freedom which the robotic device may exercise.

Figure 1:
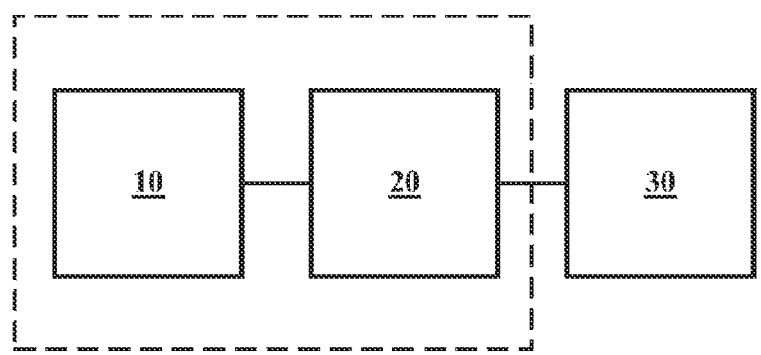
FIG. 1 schematically illustrates an exemplary control system used to control an actual robot device, in accordance with the present disclosure.

FIG. 1 schematically illustrates an exemplary computerized control system used to control an actual robot device 30. The control system translates an operator input into instructions for the actual robotic device 30. A first part of the control system includes a computerized interface 10 where an operator creates the commands that the actual robot device 30 may execute. A second part of the control system includes a motor control module 20, transforming the commands into movement operations for the actual robot device 30. The actual robotic device 30 includes a robotic manipulator or a robotic arm including a plurality of rigid segments, each of the segments connected to at least one other rigid segment through a manipulable joint portion.

The computerized interface 10 provides the operator with a console to provide operator inputs to the motor control module 20. The motor control module 20 translates operator inputs into movement commands by determining intermediate points, speeds of the joints and the effector, types of movement, and commands for a tool or tools coupled to the robotic manipulator. Commands input by the operator are saved within computerized programming in a format called a virtual state. Through the interface, one may utilize a virtual robot or a simulated robot device created through mathematical modeling to mimic the actual robotic device 30. Additionally, through the computerized interface 10, a computerized model of the workpiece being worked upon by the actual robot device 30 may be used to select configuration options for the actual robot device 30 by enabling simulated configurations of the simulated robot device, for example, determining a minimum number of degrees of freedom of the simulated robot device useful for the simulated robot device to maneuver around obstacles and complete the programmed tasks. This functionality functions as a digital duplicate of the actual robotic device to assist in determining a trajectory connecting robotic movement waypoints provided by the operator. Through this method, a list of coordinates and movement instructions are recorded to be followed by a motor control module 20 of the actual robotic device 30.

The motor control module 20 generates instructions or commands for the actual robotic device 30. The motor control module 20 may generate commands in a synchronized method or sequence. For example, commands controlling movement speed and commands related to an angle for each joint portion of the robotic manipulator in order to provide a desired sequence of movements in the robotic manipulator. Additionally, data may be provided to the motor control module 20 from sensors located on the robotic manipulator. This data provided to the motor control module 20 may be utilized to provide feedback control of the robotic manipulator through the desired sequence of movements.

Translating an operator's inputs into commands useful to control the robotic manipulator through the desired sequence of movements may include the operator providing an initial state, one or more intermediate states, and a final state, this sequence of states including position and orientation information useful to control movement and/or a pose of the robotic manipulator. Inputting information related to each of the sequence of states may include determining a plurality of control parameters for each of the states. These control parameters may include current angles for each joint portion of the manipulator, coordinates of the tool device attached to an end of the robotic manipulator, whether an intermediate point will maintain a current orientation, a type of movement being commanded, feedback data provided by sensors monitoring the robotic manipulator, and a programmed reference system. A programmed reference system includes reference values for coordinates used in the commands. The programmed reference system may be static, for example, referenced to an exemplary ground surface point, or dynamic, for example, referenced to a product moving down an assembly line. The angles and coordinates are useful to recreate a desired pose of the robotic manipulator for each of the sequence of states through the desired sequence of movements.

Movement of the robotic manipulator from a first of the sequence of states to a second of the sequence of states may include linear or straight-line motion. For example, an operator may command a tool attached to an end of the robotic manipulator to move in a straight line from one position to another. In another example, the operator may command the tool to move from one position to another while maintaining a position and orientation of one of the joint portions of the robotic manipulator through the movement. In another example, the operator may individually command movement of each of the joint portions of the robotic manipulator through a movement from one state to another state. A path between two states may be discretized or sub-divided into a plurality of smaller moves, for example, to cause the robotic manipulator to navigate through or around obstacles in proximity to the robotic manipulator. Control of the robotic manipulator through a plurality of states or sub-divisions may be described as controlling the robotic manipulator through a plurality of intermediate points or crossing points.

The control parameters and feedback from sensors monitoring the robotic manipulator provide certainties of the state of the robotic manipulator until a next intermediate point.

Four exemplary combinations of information are provided to generate different types of movement of the robotic manipulator.

TABLE 1

Exemplary Types of Motion Commanded to the Robotic Manipulator

| | User Inputs | | | Output | | Remark |
|---|---|---|---|---|---|---|
| Type of motion | Initial and final cartesian coordinates (x, y, z) | Initial and final orientation (Roll, Pitch, Yaw)* | Prescribed orientation along the trajectory | Cartesian trajectory | Orientation along trajectory | (Inverse) kinematics calculation |
| 1 | yes | no | no | random | variable | no |
| 2 | yes | yes | no | random | variable | no |
| 3 | yes | no | no | specified (linear, circular, spline etc.) | variable | yes |
| 4 | yes | yes | yes | specified (linear, circular, spline etc.) | constant | yes |

*Euler convention - Yaw: Rotation around x-axis; Pitch: Rotation around y-axis; Roll: Rotation around z-axis;

Table 1 illustrates four examples of different types of movement that may be commanded of a robotic manipulator. The calculation complexity increases progressively from top to bottom, with type 1 having the lowest calculation complexity of the examples and with type 4 having the highest calculation complexity of the examples. Calculation complexity describes increased restrictions and problems of mathematical solvability. Calculation complexity may be alternatively described as computational load. Calculation complexity increases as variables such as a number of rigid segments/number of joints and the maximum speed of each joint increase. If the calculations include use of kinematics, movement of the robotic manipulator from one state to a next state may be complex or challenging, and discretization of the movement with intermediate points may be useful.

Type 1 motion may include simple translation of the robotic manipulator from one cartesian coordinate to another. Type 1 motion includes no control over orientation of the robotic manipulator or control over the trajectory of the manipulator during movement. Type 2 motion may include translation of the robotic manipulator from one cartesian coordinate to another and additionally including control over initial and final orientation of the robotic manipulator. In one embodiment, neither the orientation along the trajectory nor the trajectory itself may be controlled in type 2 motion. Type 3 motion may include control over the trajectory of the robotic manipulator for the execution of linear, circular and spline trajectories, for example. Type 3 motion does not include control over orientation of the robotic manipulator during the movement. Type 4 motion may include control over trajectory of the robotic manipulator and control over orientation of the robotic manipulator during movement. Therefore, type 4 motion may be used for controlling motion of the robotic manipulator through a complex operation such as painting or welding and controlling motion to avoid obstacles in the environment of the robotic manipulator.

The (inverse) kinematics module is responsible for translating the information entered by the user into angle values for joints, to be used in the control of motions type 3 and/or 4. The prescribed path is divided into small segments (intermediate points) using as input the initial and final destination of the tool center point and the type of motion to be conducted between them. Between every intermediate point, the robot necessarily performs motions of type 1 and/or 2 in a continuous manner, until the target position and orientation informed by the user are achieved. The intermediate points enable the achievement of an acceptable trajectory error in terms of position and orientation.

When a distance between one state and a next state is relatively large, the method may include breaking the movement down into intermediate points or extrapolating the instructions of the operator to include sub-steps. For example, if the tool at the end of the robotic manipulator is commanded to move in a straight line, but the straight line is longer than the robotic manipulator can accomplish through command of one pair of joints, the command may be broken down into incremental commands to two pairs of joints. The system may include a library of sub-steps useful to accomplish complex or difficult commands.

Figure 2:
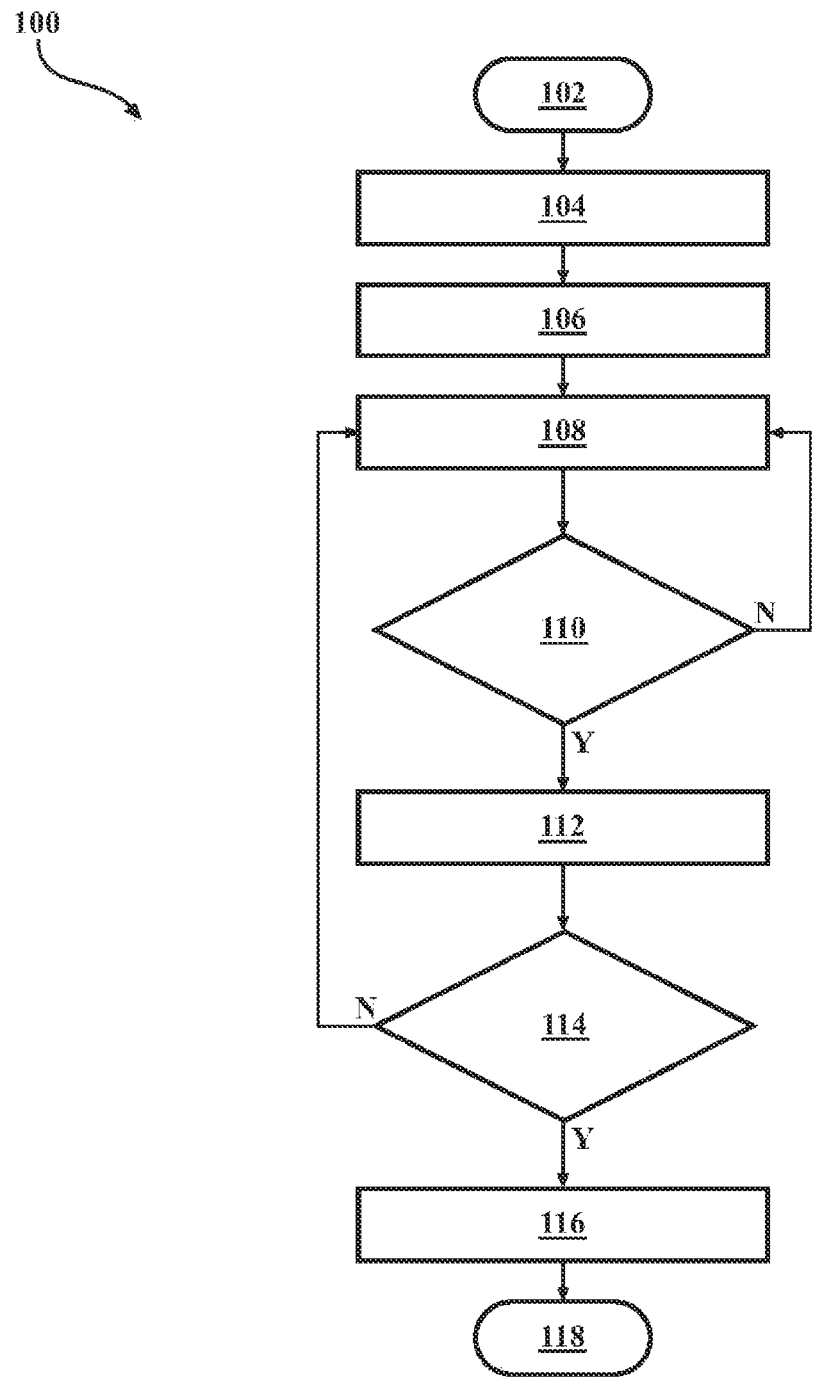
FIG. 2 is a flowchart illustrating a method to determine intermediate points between a first state and a second state, in accordance with the present disclosure.

FIG. 2 is a flowchart illustrating a method to determine intermediate points between a first state and a second state. Method 100 starts at step 102. At step 104, a distance is computed between a current robot position and a destination robot position. The current robot position and the destination robot position may be positions of a tool connected to an end of the robotic manipulator. In another embodiment, for example, where the robotic manipulator is being controlled to enter or exit a workpiece, the current robot position and the destination robot position may include positions of a joint portion in a middle of the robotic manipulator, where the position may be transitioned to achieve the entering or exiting. In step 106, the distance between the current robot position and the destination robot position may be discretized or broken into sub-portions, such that the distance may be defined in discreet steps between the current robot position and the destination robot position. The discreet steps may collectively be described as a commanded movement of the robotic manipulator. At step 108, a one of the discreet steps is defined and robotic manipulator movements to achieve the discreet step is determined. At step 110, a determination is made whether the discreet step meets linearity and orientation guidelines or limitations. If the discreet step does not meet the linearity and orientation guidelines, the method returns to step 108 where the discreet step is determined with increased margins of variation for the linearity and orientation guidelines included in the determinations. If the discreet step does meet the linearity and orientation guidelines, the method advances to step 112, where the discreet step is saved and the method advances to step 114. At step 114, a determination is made whether the most recently saved discreet step achieves the destination position for the robotic manipulator. If the most recently saved discreet step does not achieve the destination position, the method returns to step 108, where a next step is determined and steps 108 through 114 are reiterated. If the most recently saved discreet step does achieve the destination position, the method advances to step 116, where the saved steps are saved as a commanded movement of the robotic manipulator. At step 118, method 100 ends. A number of additional or alternative method steps are envisioned, and method 100 is not intended to be limited to the exemplary steps provided.

Time to determine the interactions of FIG. 2 varies according to movement complexity and an allocation of the parameters to maintain orientation, linearity in the trajectory, and a number of joints. Different embodiments of the algorithms enable use of different parameters. An algorithm may be flexible, for example, inputting or monitoring a current number of joints and capabilities of hardware present in the robotic manipulator.

Once a list of instructions to move the robotic manipulator through the series of states is generated and saved, the motor control module may utilize the instructions to command electrical motors disposed upon the robotic manipulator, command the tool installed upon an end of the robotic manipulator, and additionally command a additional equipment associated with the operations performed by the actual robot device.

Figure 3:
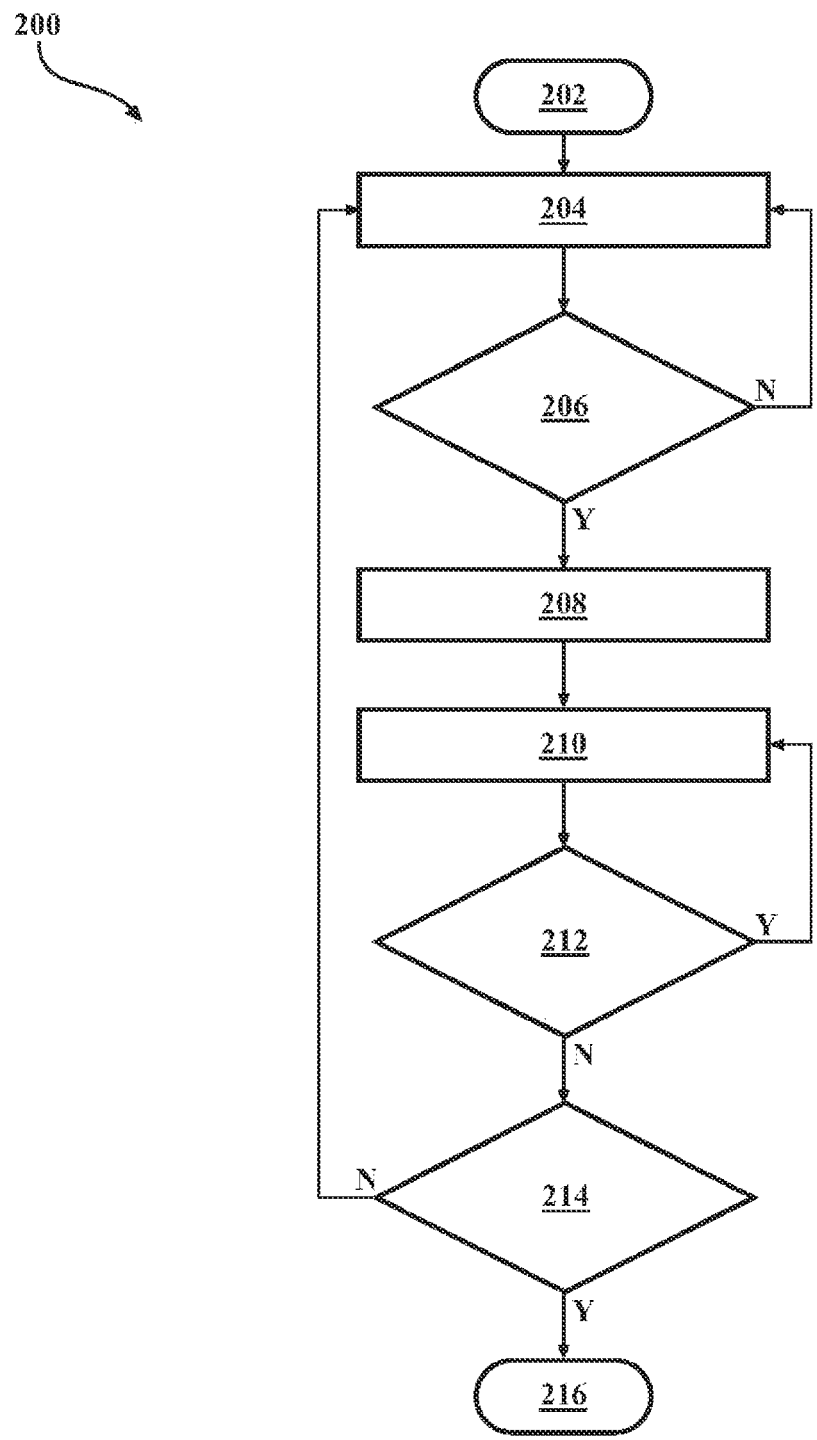
FIG. 3 is a flowchart illustrating commands being issued by the motor control module, in accordance with the present disclosure.

FIG. 3 is a flowchart illustrating commands being issued by the motor control module. Method 200 starts at step 202. At step 204, the motor control module monitors inputs such as inputs from an operator and sensor data, for example, describing arrival of a workpiece awaiting use of the robotic manipulator at a workstation. At step 206, a determination is made whether conditions are met to command movements to the robotic manipulator. If conditions are not met to command movements, the method returns to step 204. If conditions are met to command movements to the robotic manipulator, the method advances to step 208, where the motor control module commands movements to the robotic manipulator. At step 210, the motor control module provides data to the computerized interface to provide feedback to the operator. At step 212, a determination is made whether additional commanded movements are useful. If more commanded movements are useful, the method returns to step 208. If no more commanded movements are useful, the method advances to step 214, where a determination is made whether operation of the robotic manipulator is complete. If the operation of the robotic manipulator is not complete, the method returns to step 204. If operation of the robotic manipulator is complete, the method advances to step 216 where the method ends. A number of additional or alternative method steps are envisioned, and method 200 is not intended to be limited to the exemplary steps provided.

The method of FIG. 3 may run linearly. In another example, the method may run iteratively or may run in a way responsive to new inputs. For example, the method may be in the midst of steps 208, 210, and 212, running commands based upon provided data. However, new input from an operator in the midst of these steps may be run through steps 204 and 206, for example, with the operator instructing the robotic manipulator to start the method over. In one example, an inspector watching a robotic manipulator paint a part may depress a button, instructing the robotic manipulator to put a new coat of paint on the workpiece, with the robotic manipulator re-starting its operation from a starting or initial state.

Joint portions of the robotic manipulator may include an actuator, for example, embodied as an electric motor operable to utilize electric power to create movement in the robotic manipulator, a controller or a computerized device useful to control the actuator, and a gear reducer useful to transform an output torque of the actuator into desired movement of a rigid segment attached to the joint portion.

Figure 4:
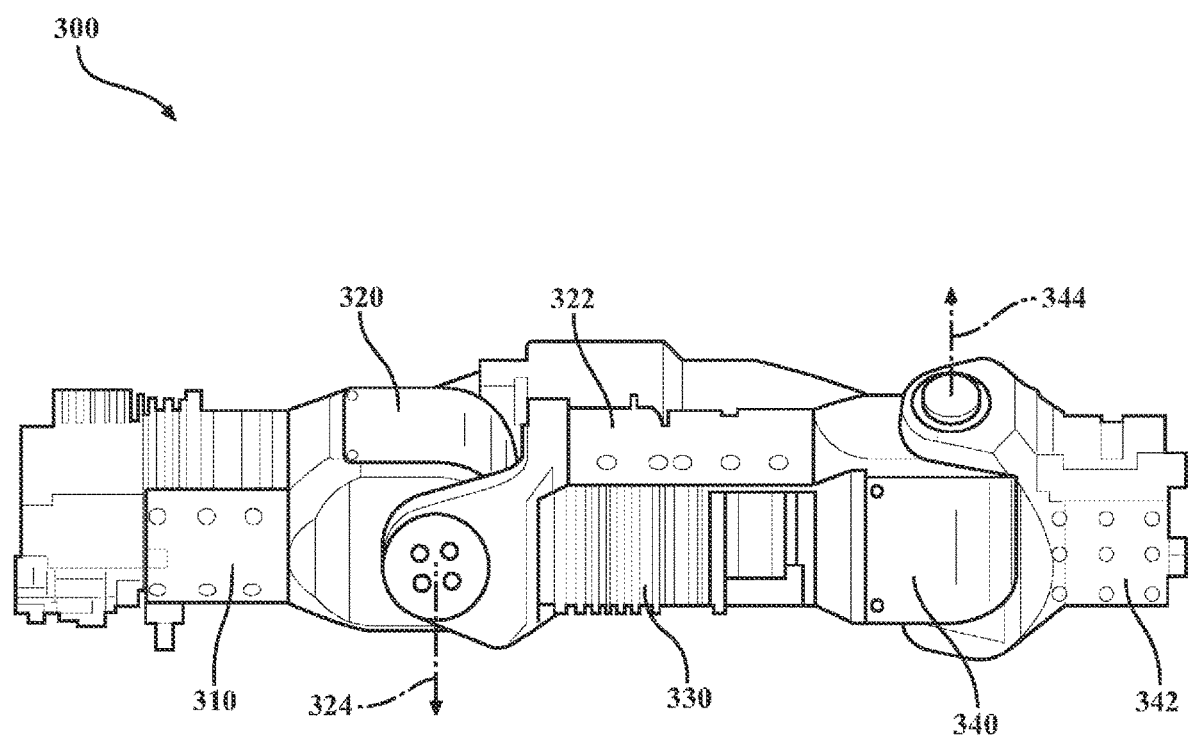
FIG. 4 schematically illustrates an exemplary robotic manipulator including two adjacent joint portions operable to bend the robotic manipulator in reference planes rotated 90 degree angles from each other, in accordance with the present disclosure.

FIG. 4 illustrates an exemplary robotic manipulator 300 including two adjacent joint portions operable to bend the robotic manipulator in reference planes rotated 90 degree angles from each other. The robotic manipulator 300 includes a first rigid segment 310 and a second rigid segment 330. The rigid segment 310 is connected to or formed unitarily with a joint portion 320 which is operable to bend about axis 324. The joint portion 320 includes a mechanical connection portion 322. The rigid segment 330 is connected to or formed unitarily with a joint portion 340 which is operable to bend about axis 344. The rigid segment 330 is connected by fastener, rivet, or by other connector to mechanical connection portion 322, such that when the joint portion 320 bends, it changes an angle of the rigid segment 330 with respect to the rigid segment 310. The joint portion 340 includes a mechanical connection portion 342 which may be connected to another rigid segment or to a tool to be attached to an end of the robotic manipulator 300.

The axis 324 may be oriented in a different direction than the axis 344. In one embodiment, the axis 324 may be rotated 90 degrees in relation to the axis 344. In such a configuration, the joint portion 320 and the joint portion 340 may collectively bend the robotic manipulator 300 in three dimensions. Further, an alternating pattern of several rigid segments and joint portions may be utilized to create a robotic manipulator 300 with useful flexibility and maneuverability.

Figure 5:
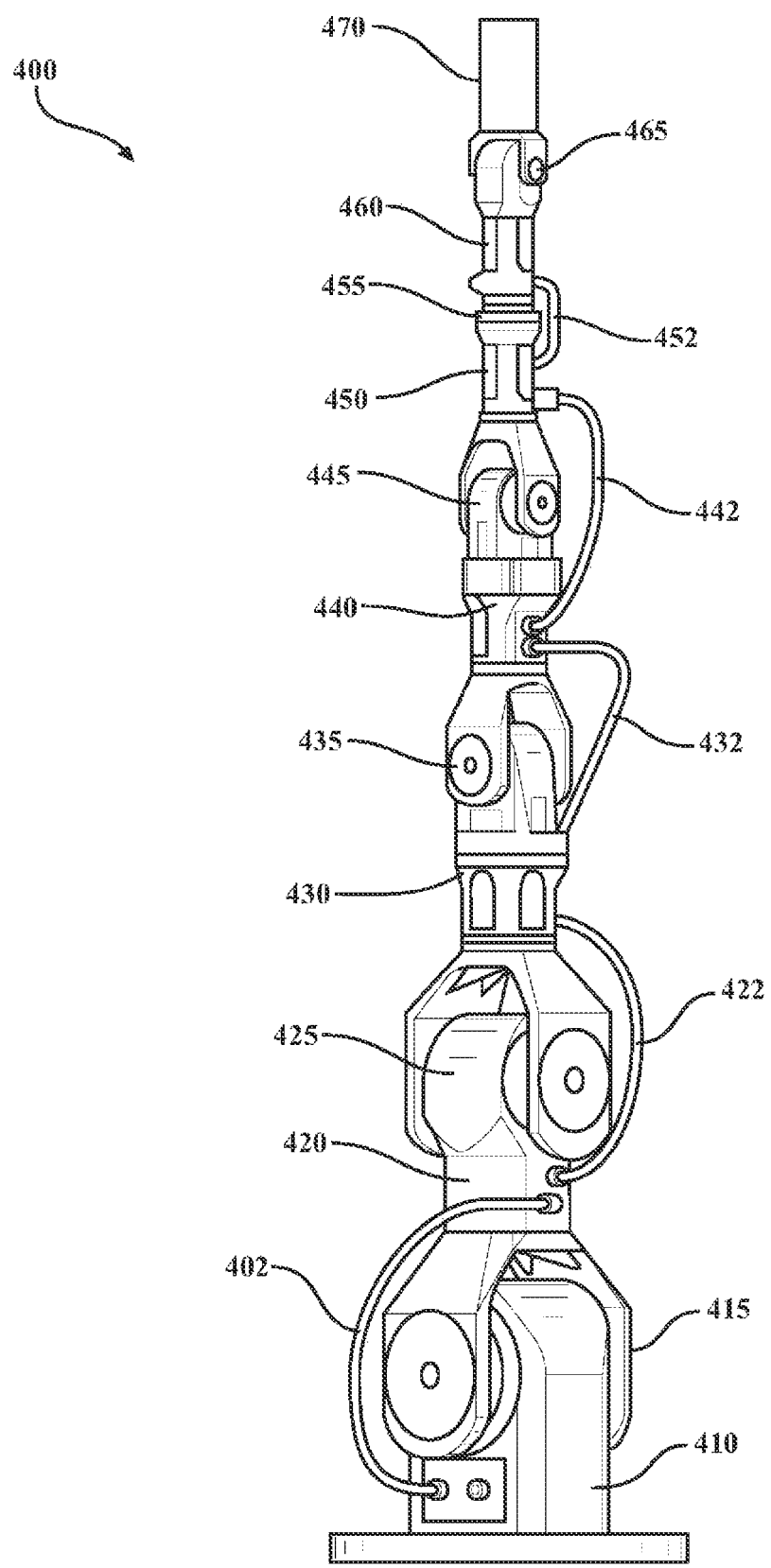
FIG. 5 schematically illustrates an exemplary robotic manipulator with rigid segments and joint portions decreasing in size along a length of the robotic manipulator, in accordance with the present disclosure.

In one embodiment, the robotic manipulator may include a plurality of rigid segments connected by a plurality of joint portions. Rigid segments and joint portions closer to a robot base may be subjected to considerably higher forces or torques than rigid segments and joint portions closer to an end of the robotic manipulator. In one embodiment, rigid segments and joint portions closer to the base may be larger in size and load handling capacity than rigid segments and joint portions closer to the end of the robotic manipulator. In one embodiment, the relative size of the rigid segments and corresponding joint portions may taper over a length of a robotic manipulator, starting near the base with a relatively large size and gradually decreasing in size over the length of the robotic manipulator. FIG. 5 schematically illustrates an exemplary robotic manipulator 400 with rigid segments and joint portions decreasing in size along a length of the robotic manipulator. Robot base 410 is illustrated which may be secured to a stationary surface. A joint portion 415 is illustrated attached to the robot base 410 and is operable to change an angle of a connected rigid segment 420 with respect to the robot base 410. A connection cable 402 is illustrated providing electrical power, communication signals, and other connective communication between the robot base 410 and the rigid segment 420. A series of rigid segments are illustrated, including a rigid segment 430, a rigid segment 440, a rigid segment 450, and a rigid segment 460, wherein each rigid segment in the series is progressively smaller in size as the rigid segment is further away from the robot base 410. Similarly, a series of joint portions are illustrated, including a joint portion 425, a joint portion 435, a joint portion 445, a joint portion 455, and a joint portion 465. The joint portion 455 is illustrated to include a rotating joint, enabling the rigid segment 460 to rotate about a longitudinal axis of the rigid segm 450. The joint portion 465 is illustrated to include a gimbal joint, enabling a tool device 470 to be adjusted with two degrees of freedom with respect to the rigid segment 460. Connection cables are illustrated which are similar to the connection cable 402, including a connection cable 422, a connection cable 432, a connection cable 442, and a connection cable 452. The plurality of modular rigid segments may be interchangeable and operable to be assembled in various combinations, for example, with the rigid segment 420 being optionally omitted and with the rigid segment 430 being installed in its place or in another example, with the rigid segment 430 being attached to the robot base 410 and with the rigid segment 420 being attached to the rigid segment 430.

Figure 6:
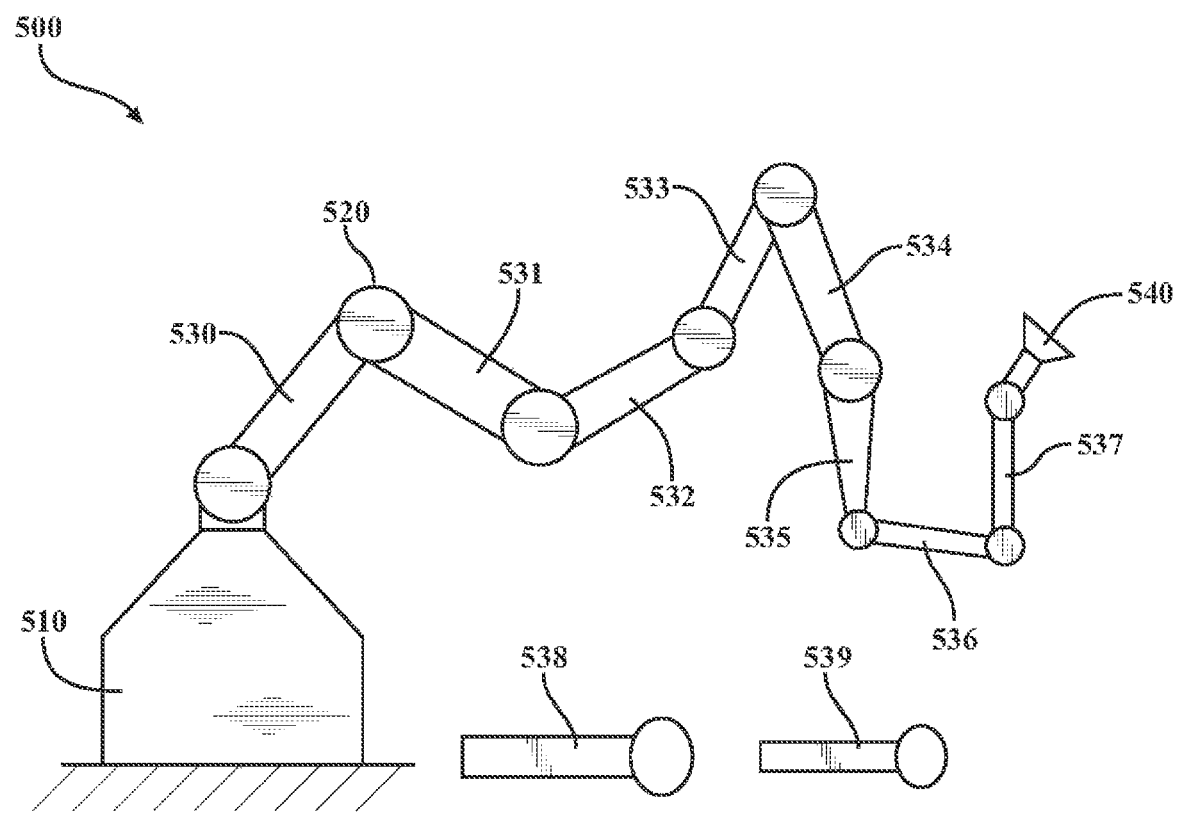
FIG. 6 schematically illustrates an exemplary robotic manipulator including modular rigid segments and joint portions useful to selectively assemble the robotic manipulator according to a desired overall length of the robotic manipulator and desired degrees of freedom in the robotic manipulator, in accordance with the present disclosure.

According to one embodiment, a robotic manipulator may be configured to include up to a certain number of rigid segments but may be operable with some minimum number of rigid segments connected to the robotic manipulator. For example, a robotic manipulator may be operable with a first rigid segment connected to a base of the actual robot device and a second rigid segment connect to the first rigid segment through a joint portion. Other rigid segments may be modularly selectively assembled to the robotic manipulator to selectively increase both a length and available degrees of freedom of the robotic manipulator. FIG. 6 schematically illustrates an exemplary robotic manipulator 500 including modular rigid segments and joint portions useful to selectively assemble the robotic manipulator 500 according to a desired overall length of the robotic manipulator 500 and desired degrees of freedom in the robotic manipulator 500. The robotic manipulator is illustrated including a robot base 510 and a series of rigid segments including a rigid segment 530, a rigid segment 531, a rigid segment 532, a rigid segment 533, a rigid segment 534, a rigid segment 535 a rigid segment 536, and a rigid segment 537. Each of the rigid segments is connected to a neighboring rigid segment with a joint portion 520. Each of the rigid segments and a connected joint portion 520 are modular, meaning that they may be disconnected from each other and reconnected to other rigid segments to create an alternative configuration of the robotic manipulator 500. A relatively larger rigid segment 538 and a relatively smaller rigid segment 539 are illustrated separate from the robotic manipulator 500. The rigid segment 538 and the rigid segment 539 may be selectively installed to the robotic manipulator 500 to increase a length of the robotic manipulator 500 and increase a number of degrees of freedom in which the robotic manipulator 500 may operate. A tool device 540 is illustrated including a vacuum gripping device useful for placing an object upon a workpiece. Modular rigid segments and joint portions 520 may enable modular assembly of the robotic manipulator 500. FIG. 6 illustrates seven rigid segments, each connected to another rigid segment with at least one joint portion to another of the rigid segments. A robotic manipulator may be constructed with a number of alternating rigid segments and joint portions.

Figure 7:
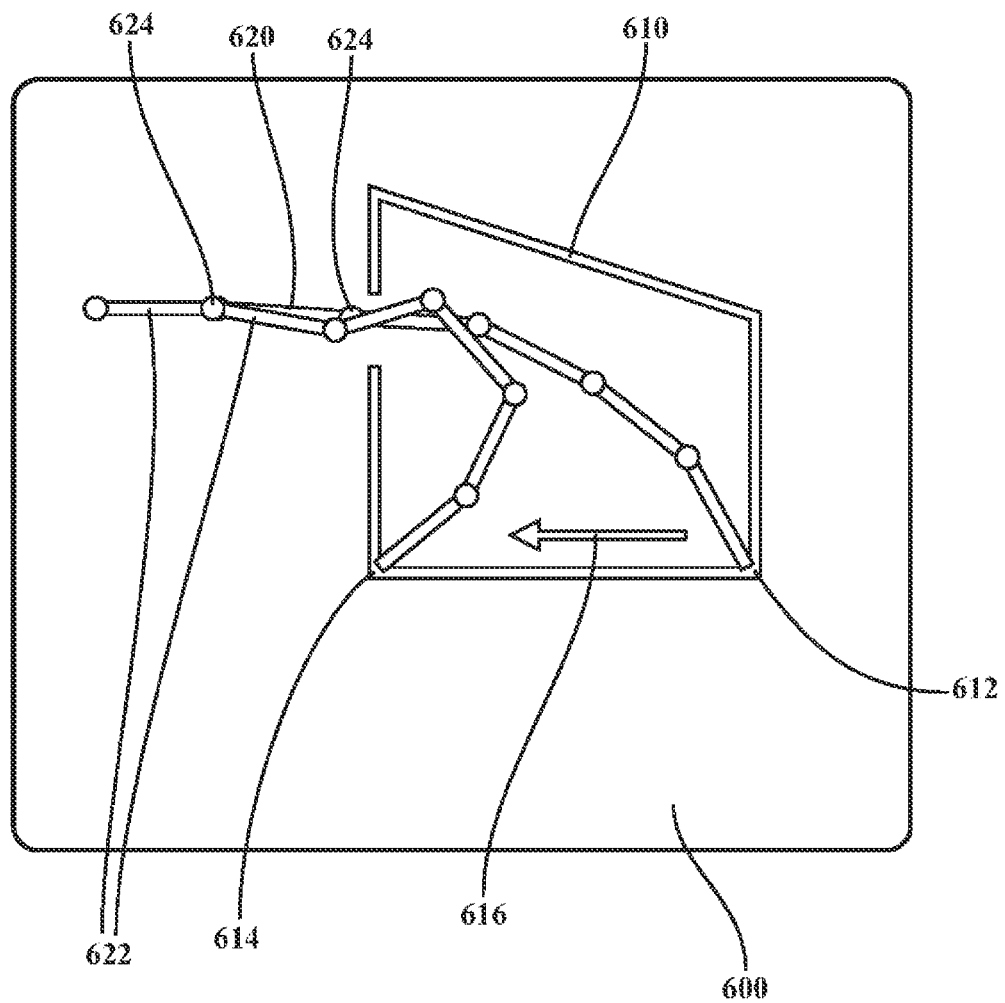
FIG. 7 schematically illustrates a display screen of an operator interface providing a simulating operation of the actual robot device, in accordance with the present disclosure.

The disclosed robotic manipulator may include a plurality of joint portions and a plurality of rigid segments, with the alignment and iteration of the joint portions enabling the robotic manipulator to move the rigid segments into a large number of configurations. Increasing numbers of joint portions enable more degrees of freedom in the robotic manipulator. A particular work task to be performed may be analyzed to determine a minimum number of degrees of freedom to perform the task, and the robotic manipulator may be created to match or exceed the determined minimum number of degrees of freedom. FIG. 7 schematically illustrates a display screen 600 of a computerized interface providing simulated operation of an actual robot device. A simulated robot device 620 is illustrated, including a plurality of rigid segments 622 and a plurality of joint portions 624. A workpiece 610 is illustrated upon the display screen 600. The computerized interface may be programmed with capabilities and limitations of the simulated robot device 620, including capabilities and limitations driven by a total number and types of the joint portions 624. The computerized interface may monitor geometry and restraints describing the workpiece 610 and may monitor operations to be performed upon the workpiece 610 by the simulated robot device 620. Monitoring operations to be performed may include monitoring operation of the mobile robot base and corresponding movement of the workpiece 610. Movement of the simulated robot device 620 may be analyzed, for example, to determine a number of degrees of freedom useful to move the simulated robot device 620 into and out of the workpiece 610 and to determine operability useful to move the simulated robot device 620 from a first location 612 to a second location 614 through a transition 616. Analysis of the simulated robot device 620 may additionally include analysis of the geometry of the workpiece 610 and a determination whether a part of the simulated robot device 620 ever impermissibly touches the workpiece 610.

Figure 8:
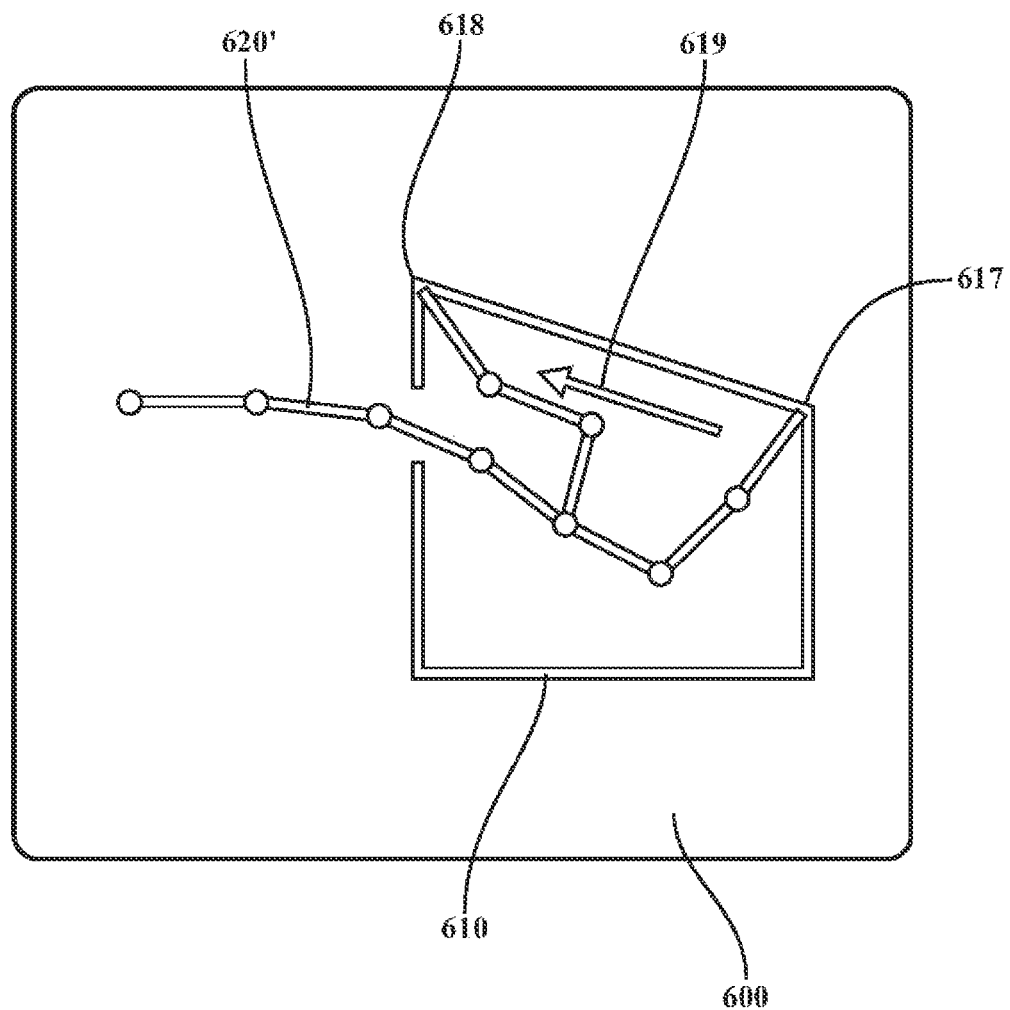
FIG. 8 schematically illustrates the display screen of FIG. 7, wherein additional tasks being requested of the simulated robot device may be utilized to define a new robot configuration and input commands to the simulated robot device, in accordance with the present disclosure.

FIG. 8 schematically illustrates the display screen 600 of FIG. 7, wherein additional tasks being requested of the simulated robot device 620 may be utilized to define a new robot configuration and input commands to the simulated robot device 620. An operator may define that the simulated robot device may further be tasked to additionally move from a third location 617 of the workpiece 610 to a fourth location 618 through transition 619. As a result of the added parameters for moving the simulated robot device, modifications may be simulated to the simulated robot device to create a modified simulated robot device 620'.

Figure 9:
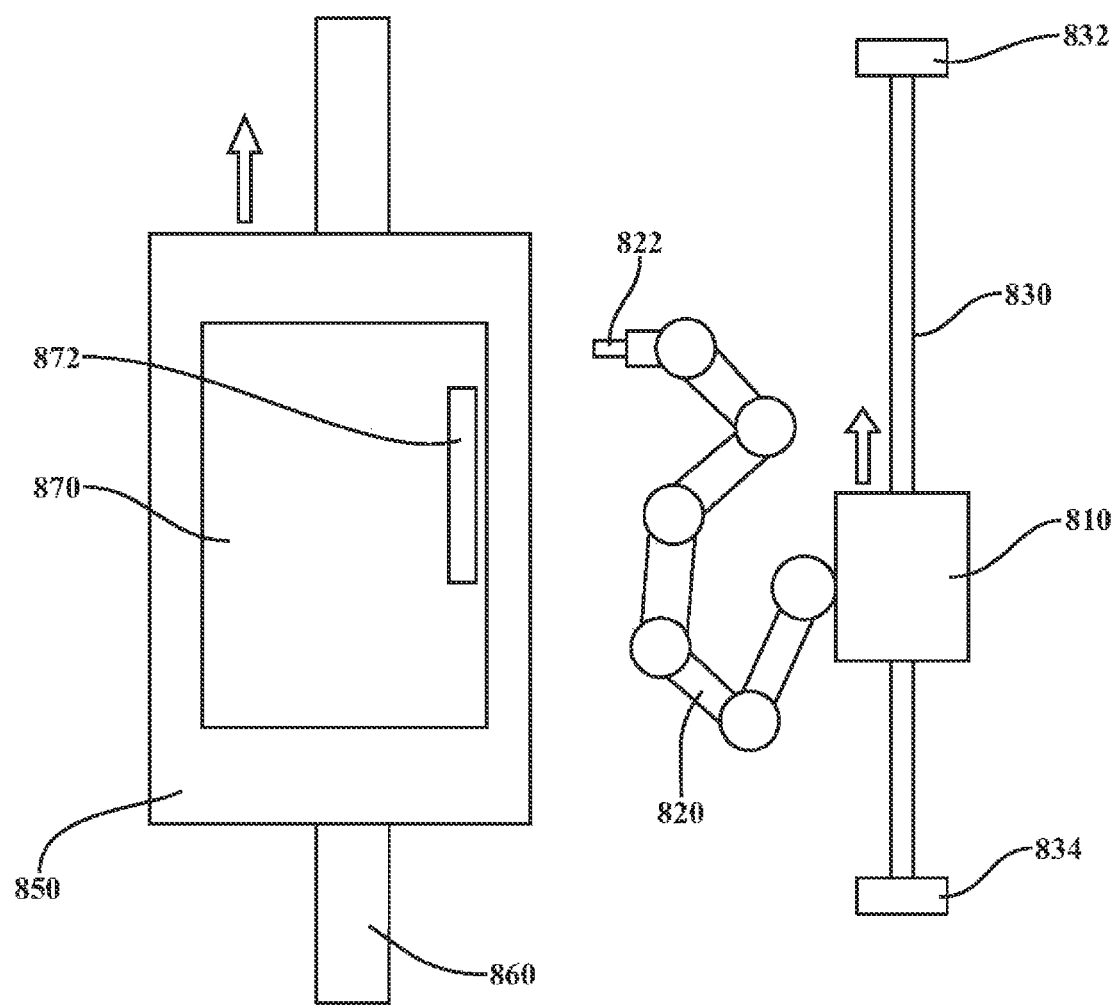
FIG. 9 schematically illustrates an exemplary actual robot device operable to move alongside a moving workpiece such that the actual robot device may perform a task upon the moving workpiece, in accordance with the present disclosure.

Mobile actual robot devices may be utilized to perform work in a complex environment. In one example, a moving reference system may be utilized with the actual robot device moving along with a moving workpiece to accomplish a task upon the moving workpiece. FIG. 9 schematically illustrates an exemplary actual robot device 810 operable to move alongside a moving workpiece 870 such that the actual robot device 810 may perform a task upon the moving workpiece 870. The actual robot device 810 is mounted to an exemplary rail device 830 situated between a first rail stop 832 and a second rail stop 834, such that the actual robot device 810 may move to a location along the rail device 830. The moving workpiece 870 is illustrated mounted to a moving pallet 850 mounted upon a rail device 860. As the moving workpiece 870 moves along the rail device 860, the actual robot device 810 may include a mobile robot base and may be controlled to similarly move along the rail device 830, such that a robotic manipulator 820 of the actual robot device 810 may be used to move a tool 822 through an opening 872 in the workpiece 870.

Figure 10:
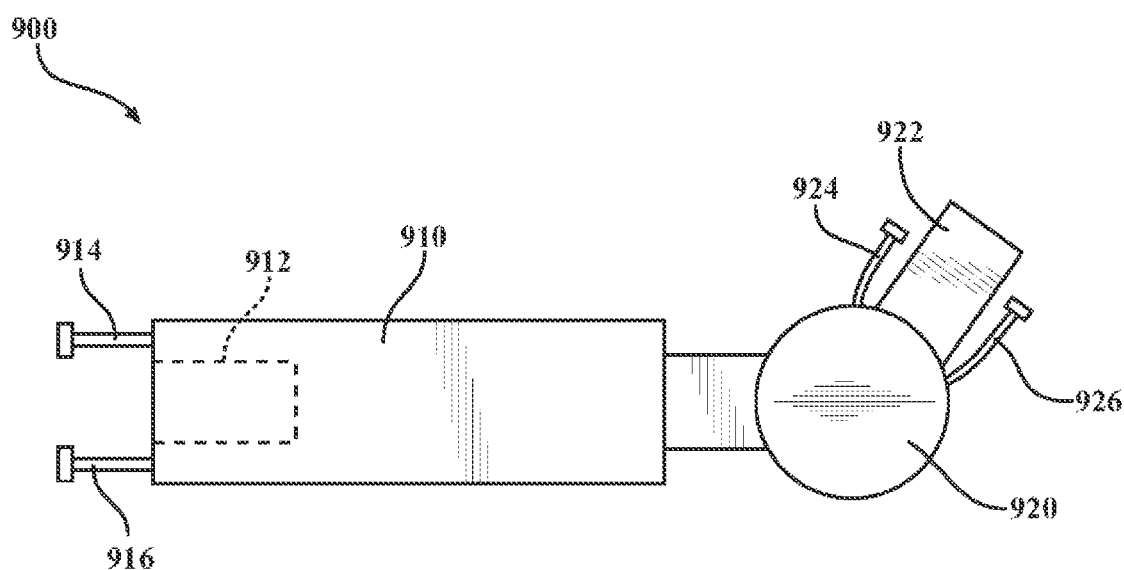
FIG. 10 illustrates an exemplary rigid segment formed unitarily with an attached joint portion and including mechanical, electrical power, and signal connections at each end, in accordance with the present disclosure.

Modular construction of the rigid segments and associated joint portions may include a number of variations. FIG. 10 illustrates configuration 900 including an exemplary rigid segment 910 formed unitarily with an attached joint portion 920 and including mechanical, electrical power, and signal connections at each end. The rigid segment 910 is illustrated including a female mechanical connection 912, a power cable 914, and a data cable 916. The joint portion 920 is illustrated including a male mechanical connection 922, a power cable 924, and a data cable 926. A plurality of rigid segments 910 could be connected in series, with the mechanical, power, and data or signal connections connecting each rigid segment 910 in a chain to form a portion of a robotic manipulator.

Figure 11:
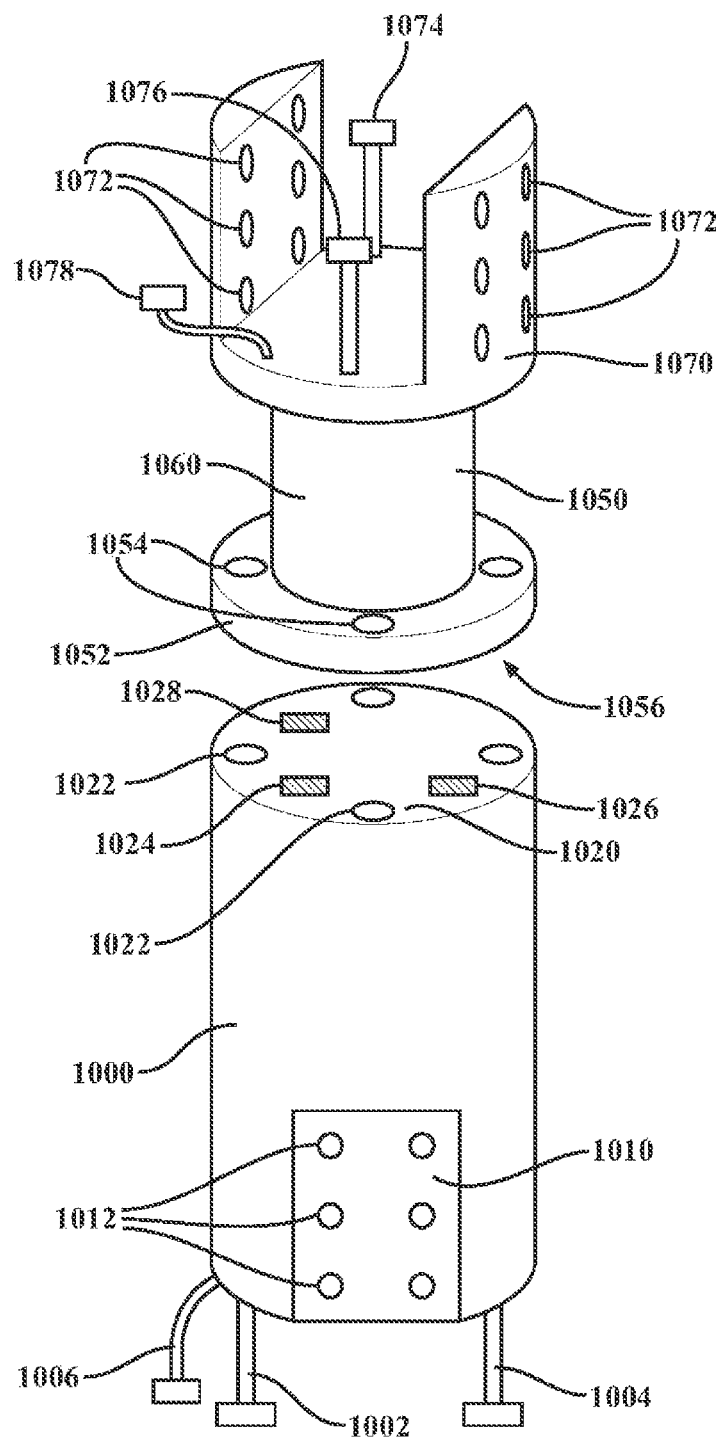
FIG. 11 illustrates an exemplary rigid segment provided separately from a joint portion, with each being selectively attached and each including mechanical, electrical power, and signal connections, in accordance with the present disclosure.

FIG. 11 illustrates an exemplary rigid segment 1000 provided separately from a joint portion 1050, with each being selectively attached and each including mechanical, electrical power, and signal connections. The rigid segment 1000 and the joint portion 1050 are similar to the rigid segment 910 and the joint portion 920 of FIG. 10, with the exception that the rigid segment 1000 and the joint portion 1050 are selectively connected at surfaces 1020 and 1056, respectively. Bolt holes 1054 and bolt holes 1022 align and are operable to receive threaded bolt fasteners which enable the rigid segment 1000 and the joint portion 1050 to be connected. The rigid segment 1000 includes a power cable 1002 and a data cable 1004. The rigid segment 1000 further includes an auxiliary connection 1006, for example, providing a flow of pressurized air, paint, water, or a separate power connection to a tool device upon an end of the robotic manipulator. The surface 1020 includes a power connection 1024, a data connection 1026, and an auxiliary connection 1028, which are matched by mating connections on surface 1056. The rigid segment 1000 further includes a mechanical connector surface 1010 on both a front and back surface, each including six exemplary bolt holes 1012.

The joint portion 1050 includes a servo motor 1060 configured to rotate a mechanical connector portion 1070 in relation to collar 1052. In an alternative embodiment, a bending joint portion may be substituted for the joint portion 1050. The mechanical connector portion 1070 is operable to connect to a mechanical connector surface similar to the mechanical connector surface 1010 on another rigid segment. The joint portion 1050 further includes a power cable 1074, a data cable 1076, and an auxiliary connector 1078. The mechanical connector portion 1070 includes a plurality of bolt holes 1072 matching the bolt holes 1012, making the mechanical connector portion 1070 capable of being connected in series to an identical or similar rigid segment including bolt holes similar to the bolt holes 1012.

Figure 12:
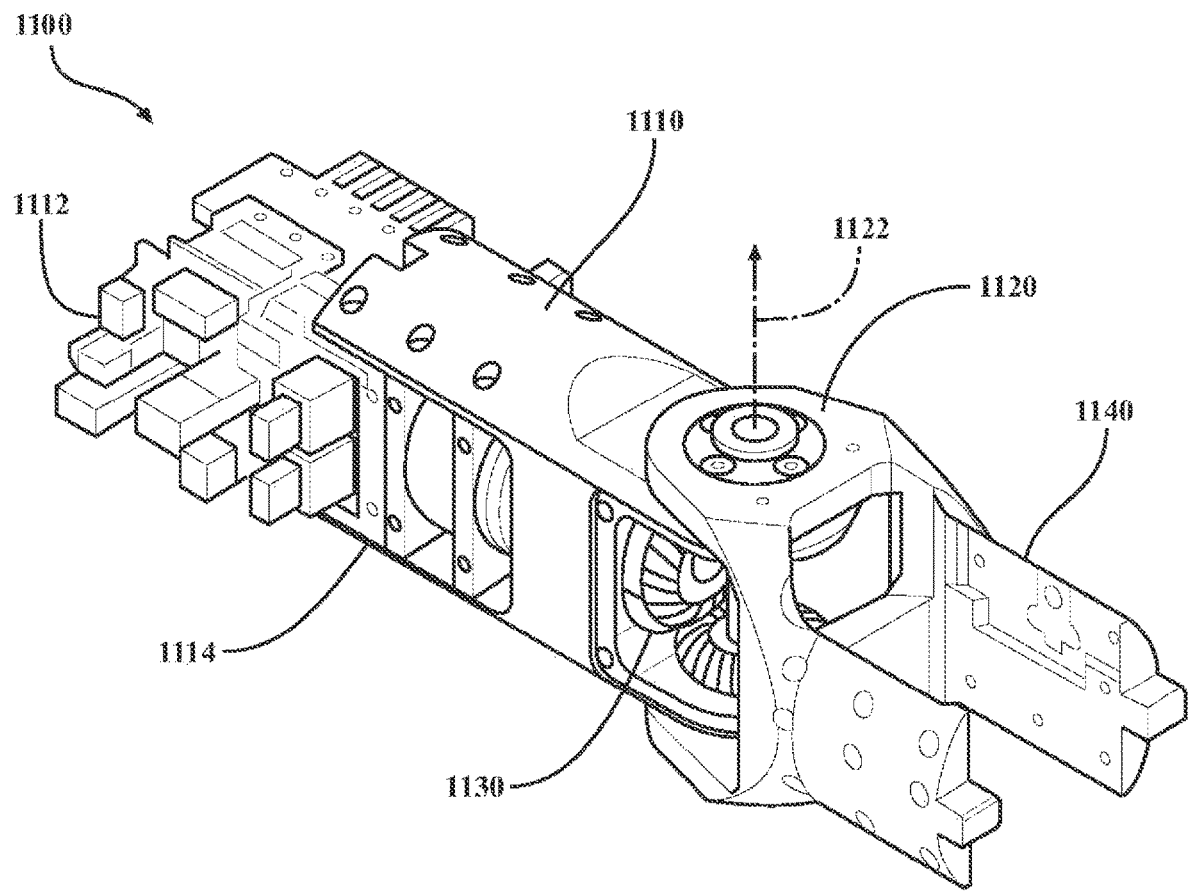
FIGS. 12-14 illustrate an additional exemplary first rigid segment and joint portion operable to bend a second attached rigid segment with respect to the first rigid segment, in accordance with the present disclosure.
Figure 13:
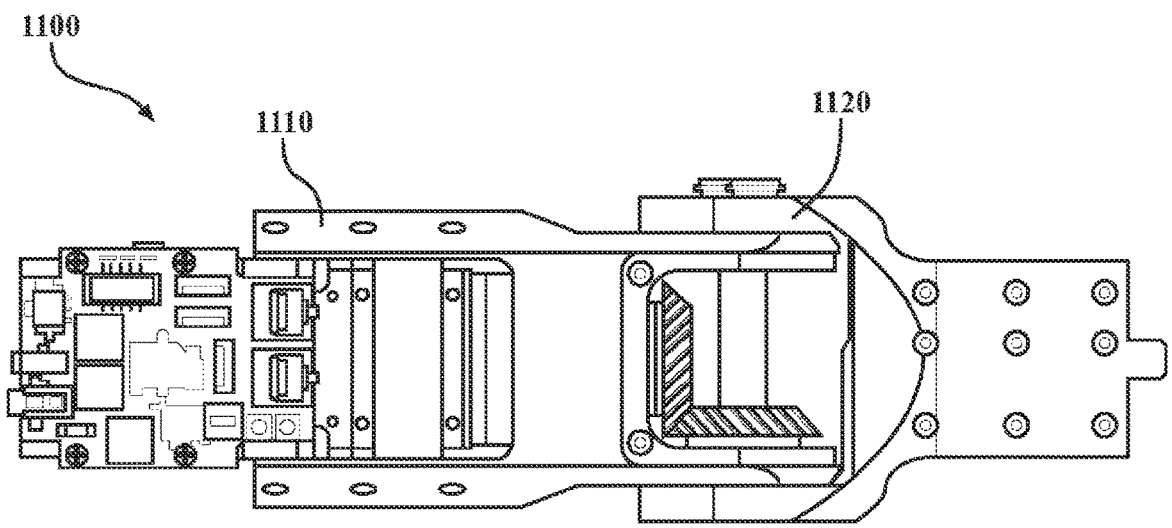
Figure 14:
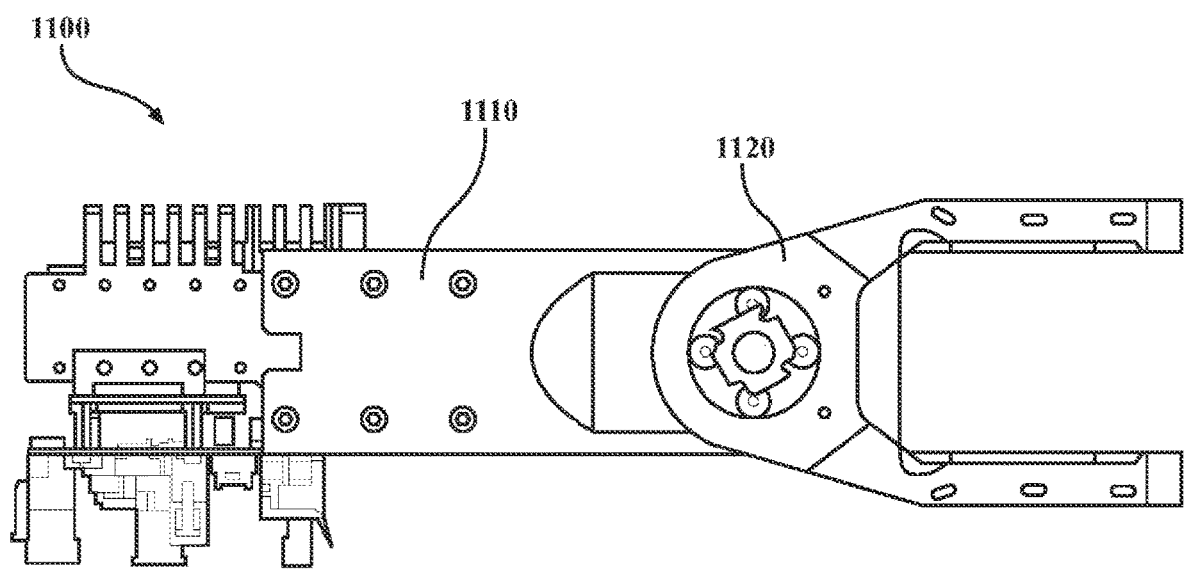

FIGS. 12-14 schematically illustrate a configuration 1100 including an additional exemplary first rigid segment 1110 and joint portion 1120 operable to bend a second attached rigid segment with respect to the first rigid segment 1110. The first rigid segment 1110 is illustrated including a computerized controller device 1112 and a servo motor 1114. The computerized controller device 1112 receives commands from the motor control module and provides power and/or communication signals commanding the servo motor 1114 to provide an output torque. A gear transmission 1130 is illustrated configured to utilize the output torque of servo motor 1114 to rotate a mechanical connection portion 1140 about an axis 1122. FIG. 12 illustrates the first rigid segment 1110 and the joint portion 1120 in a perspective view. FIG. 13 illustrates the first rigid segment 1110 and the joint portion 1120 in a front view. FIG. 14 illustrates the first rigid segment 1110 and the joint portion 1120 in a top view.

Figure 15:
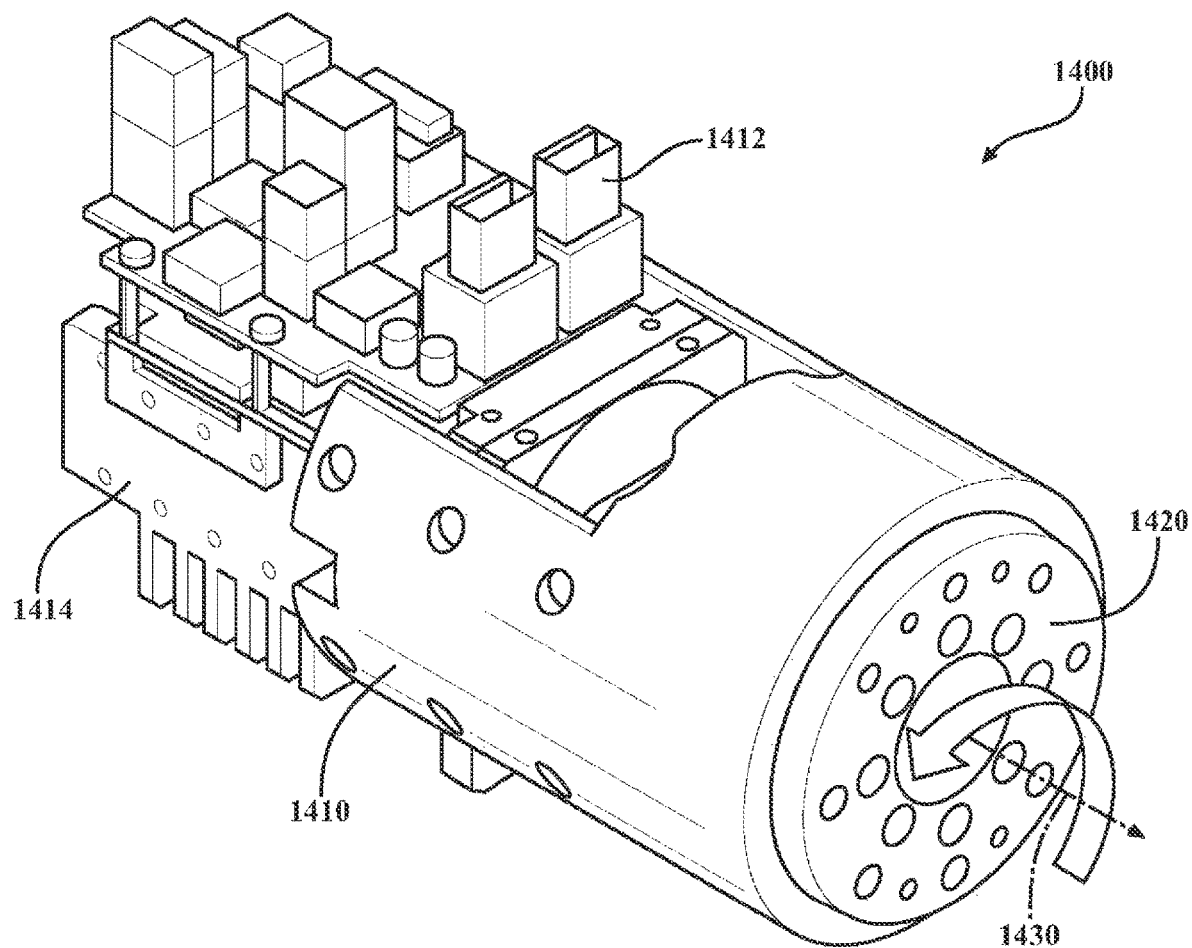
FIGS. 15-17 illustrate an additional exemplary first rigid segment and joint portion operable to rotate a second attached rigid segment with respect to the first rigid segment, in accordance with the present disclosure.
Figure 16:
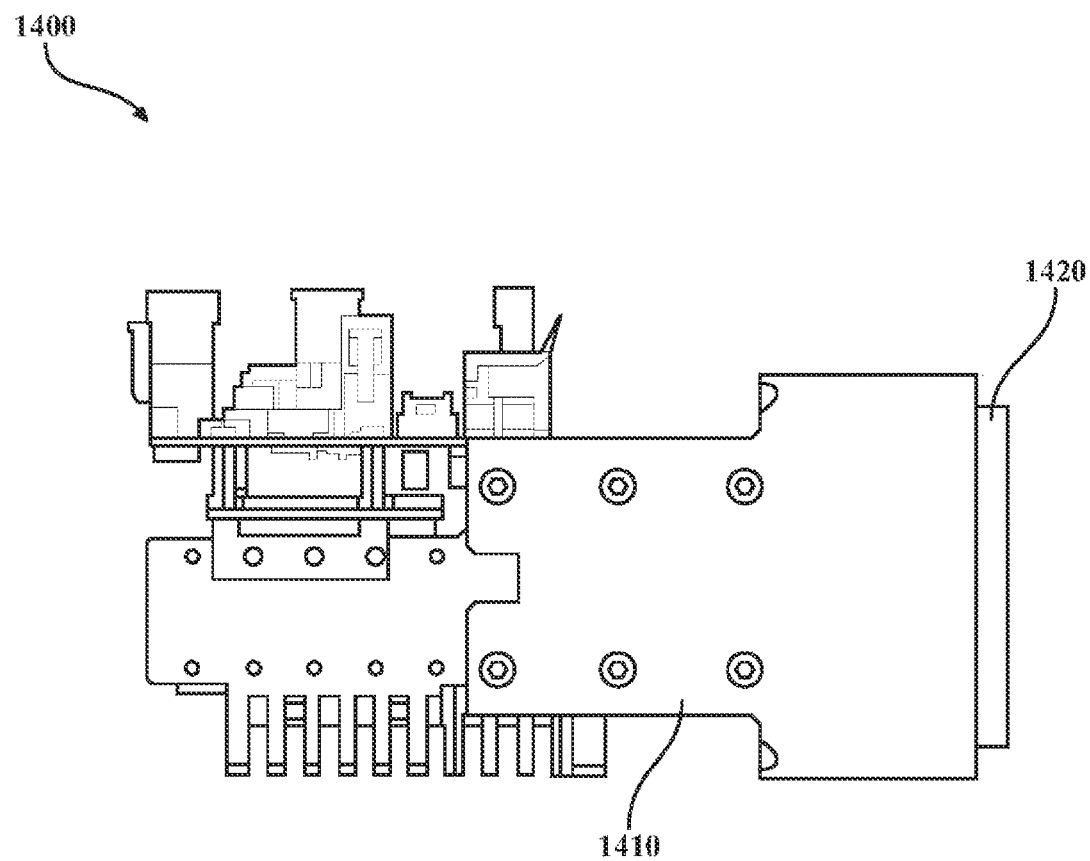
Figure 17:
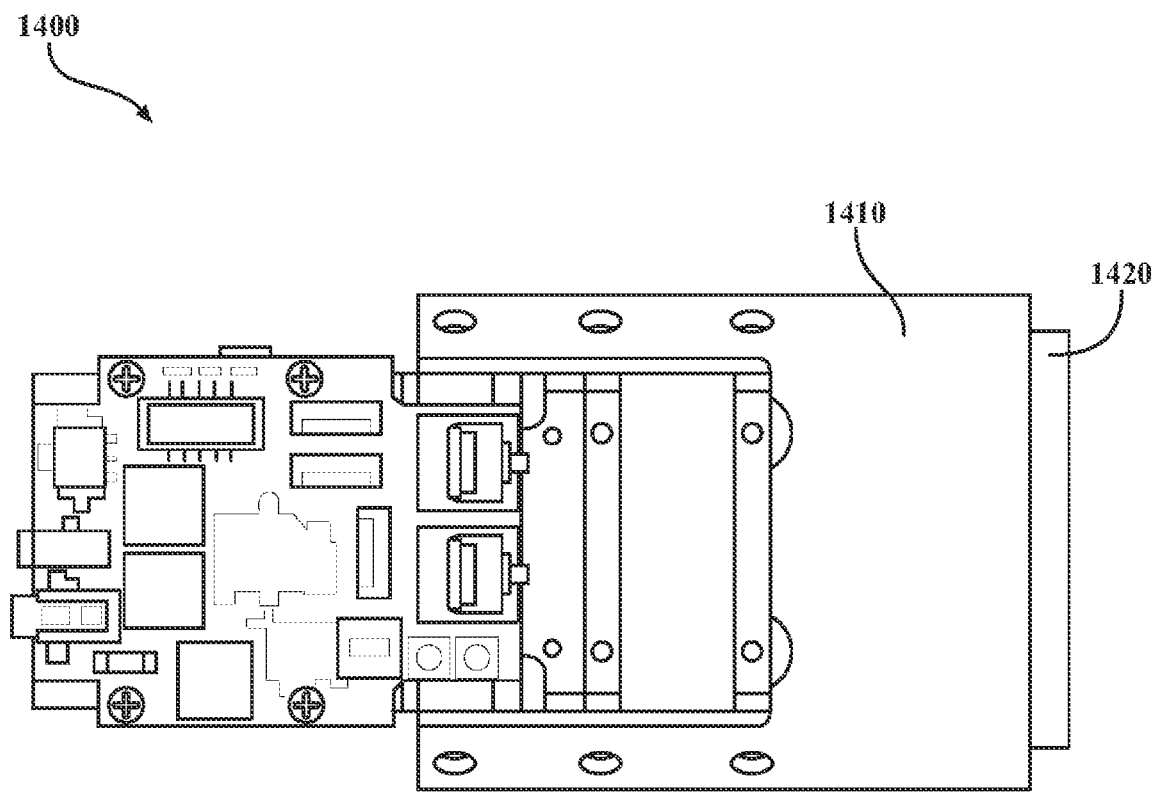

FIGS. 15-17 schematically illustrate a configuration 1400 including an additional exemplary first rigid segment 1410 and a joint portion 1420 operable to rotate a second attached rigid segment with respect to the first rigid segment 1410. The first rigid segment 1410 is illustrated including a computerized controller device 1412 and a servo motor 1414. The computerized controller device 1412 receives commands from the motor control module and provides power and/or communication signals commanding the servo motor 1414 to provide an output torque used to turn the joint portion 1420 about axis 1430 with respect to the rigid segment 1410. FIG. 15 illustrates the first rigid segment 1410 and the joint portion 1420 in a perspective view. FIG. 16 illustrates the first rigid segment 1410 and the joint portion 1420 in a front view. FIG. 17 illustrates the first rigid segment 1410 and the joint portion 1420 in a top view.

Figure 18:
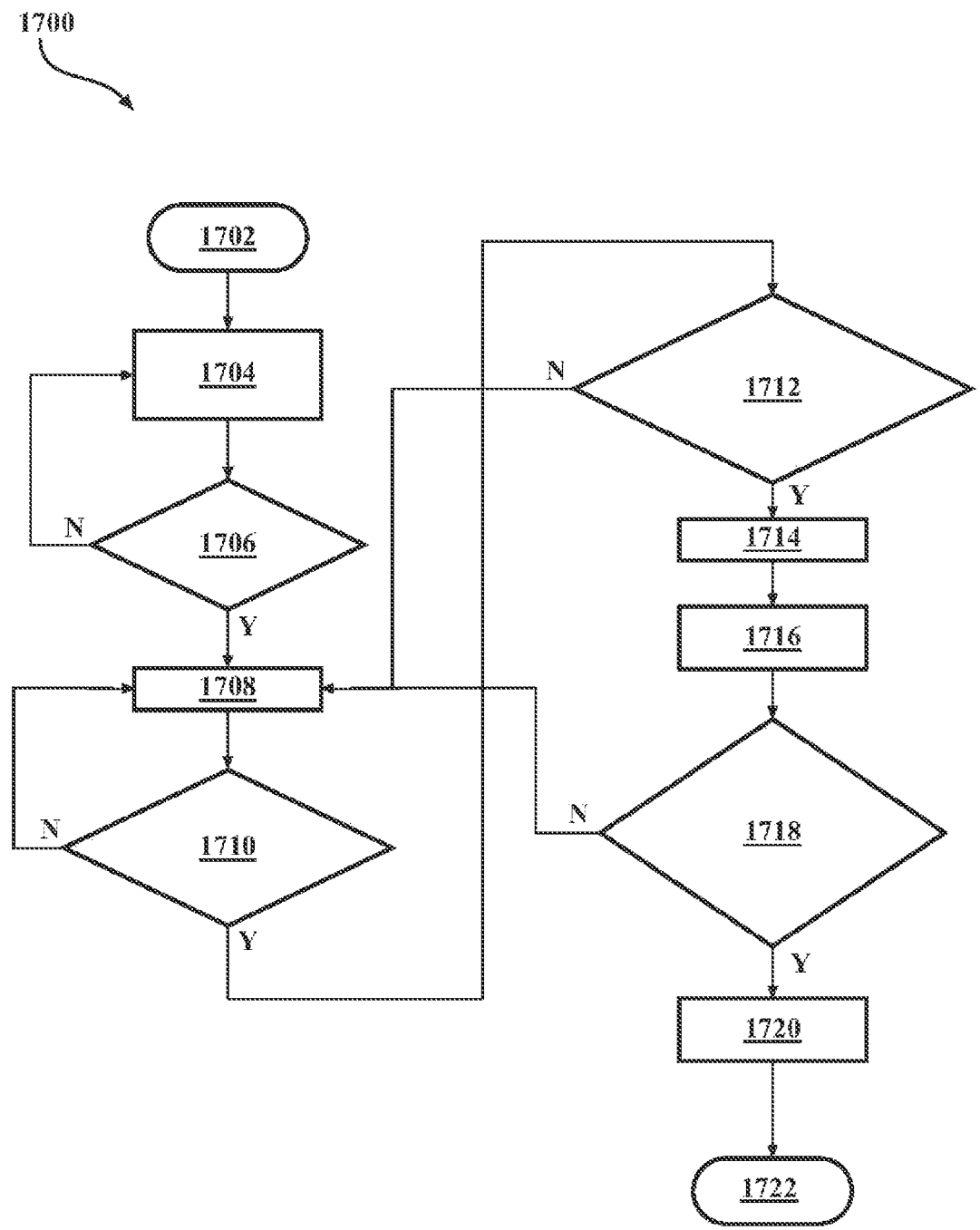
FIG. 18 is a flowchart illustrating control software and an inverse kinematics solver modularity method, in accordance with the present disclosure.

FIG. 18 is a flowchart illustrating control software and an inverse kinematics solver modularity method 1700. The method 1700 starts at step 1702. At step 1704, an operator defines a robotic manipulator configuration including a number of type of joint portions to be utilized in a simulated robot device. At step 1706, a determination is made whether the input configuration is valid. If the input configuration is not valid, the method returns to step 1704, where an error message is provided and the operator may remedy the error. If the input configuration is valid, the method advances to step 1708, where the computerized system compiles available data regarding the simulated robot device. At step 1710, a determination is made whether a new control directive has been generated, which may include new information generated regarding limitations and capabilities of the simulated robot device and/or simulated objects within the environment of the device and/or tasks to be performed by the device. If a new control directive has not been generated, the method returns to step 1708. If a new control directive has been generated the method advances to step 1712, where a determination is made whether the programming has initialized and loaded the new control directive. If the programming has not initialized and loaded the new control directive, the method returns to step 1708. If the programming has initialized and loaded the new control directive, the method advances to step 1714, where a checksum is generated. At step 1716, control programming is opened or accessed. At step 1718, a determination is made whether the open programming is adapted to the new directive. If the open programming is not adapted to the new directive, the method returns to step 1708. If the open programming has adapted to the new directive, the method advances to step 1720, where the programming may be said to include a robot-read interface. At step 1722, the method ends. A number of additional or alternative method steps are envisioned, and method 1700 is not intended to be limited to the exemplary steps provided.

Figure 19:
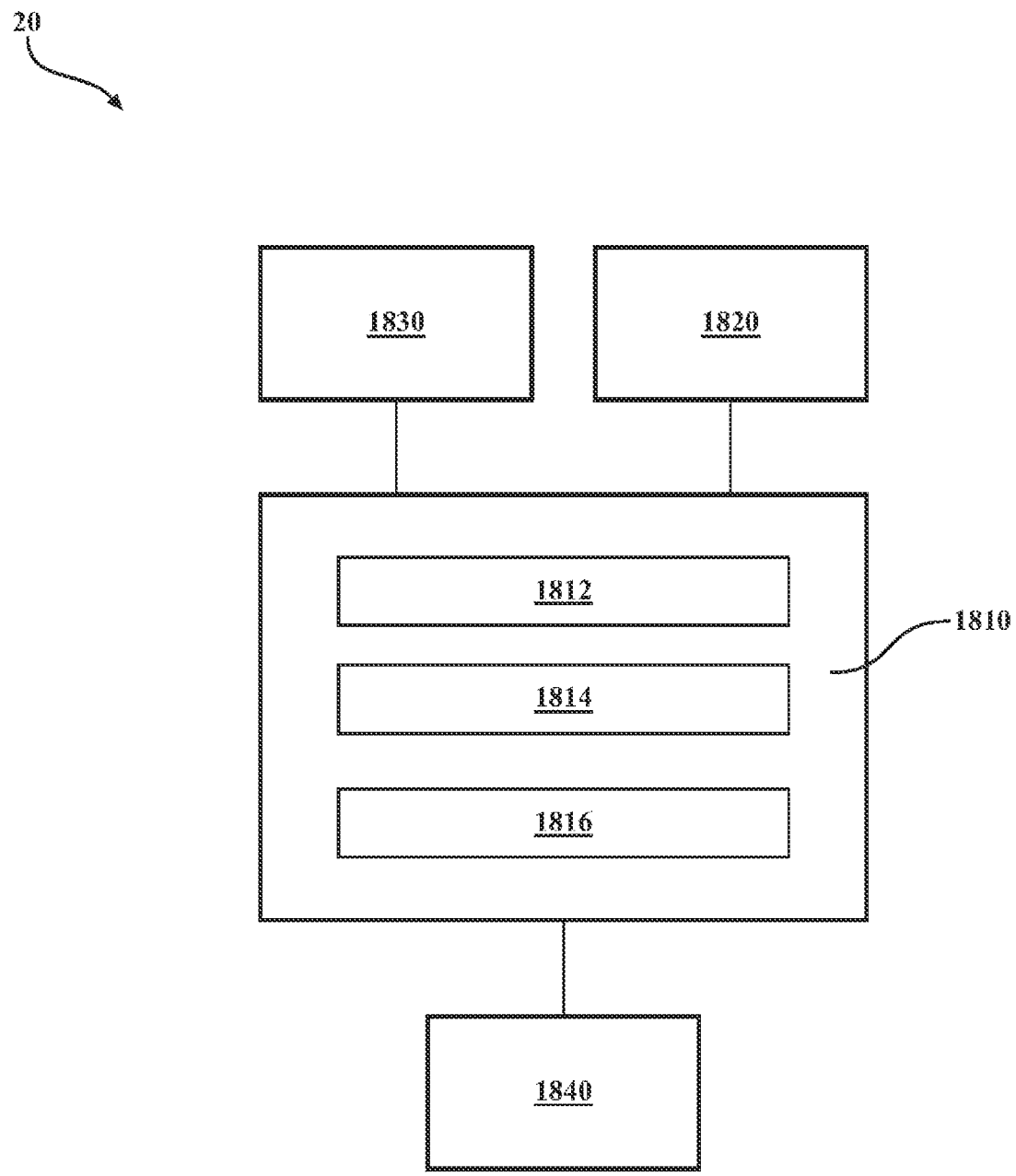
FIG. 19 schematically illustrates the motor control module of FIG. 1, in accordance with the present disclosure.

FIG. 19 schematically illustrates the motor control module of FIG. 1. Motor control module 20 may include processing device 1810 configured to operate computerized programming. In the illustrative embodiment illustrating optional features of the disclosed system, motor control module 20 includes a processing device 1810, an input/output interface 1830, a communications device 1820, and a memory device 1840. It is noted that motor control module 20 may include other components and some of the components are not present in some embodiments.

The processing device 1810 may include memory, e.g., read only memory (ROM) and random-access memory (RAM), storing processor-executable instructions and one or more processors that execute the processor-executable instructions. In embodiments where the processing device 1810 includes two or more processors, the processors may operate in a parallel or distributed manner. Processing device 1810 may execute the operating system of the motor control module 20. Processing device 1810 may include one or more modules executing programmed code or computerized processes or methods including executable steps. Illustrated modules may include a single physical device or functionality spanning multiple physical devices. In the illustrative embodiment, the processing device 1810 also a workpiece geometry and restraint analysis module 1812, a robotic state modeling module 1814, and a recommended robot configuration module 1816 which are described in greater detail below.

The input/output interface 1830 is a device that allows a user to interact with the motor control module 20. While one input/output interface 1830 is shown, the term "user interface" may include, but is not limited to, a touch screen, a physical keyboard, a mouse, a microphone, a speaker, and other user interface devices in the art. Additionally, the input/output interface 1830 may include hardware useful for the motor control module to provide commands to and receive data feedback from the robotic device being controlled.

The communications device 1820 may include a communications/data connection with a bus device configured to transfer data to different components of the system and may include one or more wireless transceivers for performing wireless communication.

The memory device 1840 is a device that stores data generated or received by the motor control module 20. The memory device 1840 may include, but is not limited to, a hard disc drive, an optical disc drive, and/or a flash memory drive.

The workpiece geometry and restraint analysis module 1812 includes programming configured to model and provide analysis of the workpiece associated with the robotic device and provide details regarding how a robotic manipulator may move to accomplish work tasks upon the workpiece.

The robotic state modeling module 1814 includes programming configured to utilize details regarding the workpiece and work tasks to be performed to define a plurality of states through which the robotic manipulator may transition to accomplish the work tasks.

The recommended robot configuration module 1816 includes programming configured to utilize available information to determine a minimum number of degrees of freedom and/or a recommended robotic manipulator configuration useful to move the robotic device through the plurality of states defined by the robotic state modeling module 1814.

Motor control module 20 is provided as an exemplary computerized device capable of executing programmed code to operate a modular robotic device. A number of different embodiments of motor control module 20, devices attached thereto, and modules operable therein are envisioned, and the disclosure is not intended to be limited to examples provided herein.

Figure 20:
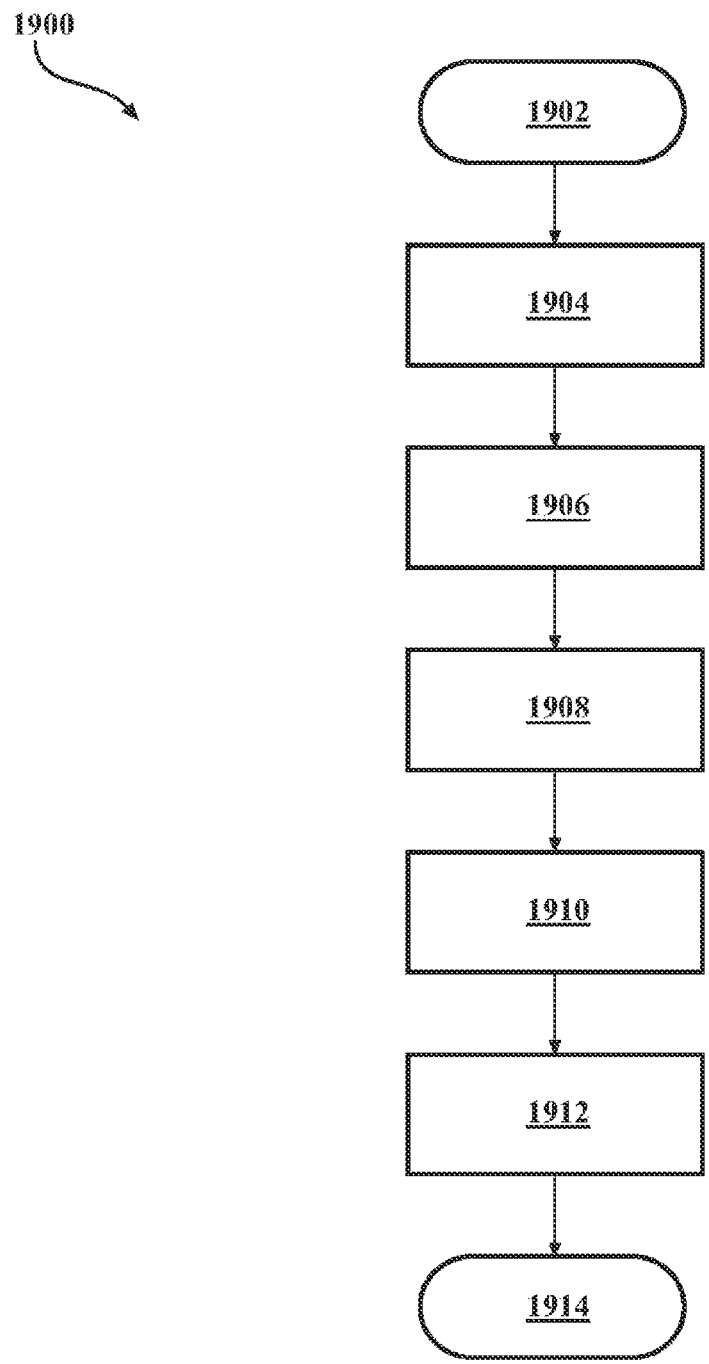
FIG. 20 is a flowchart illustrating an exemplary method to operate a modular robotic device, in accordance with the present disclosure.

FIG. 20 is a flowchart illustrating a computerized method 1900 to operate a modular robotic device. Method 1900 starts at step 1902. At step 1904, a geometry and other system restraints describing a workpiece and operations to be performed upon the workpiece are input. At step 1906, a plurality of states for operating the robot are defined and transitions between the various states are mapped in accordance with methods disclosed herein. At step 1908, the plurality of states and the plurality of transition are analyzed, and a number of degrees of freedom in a robotic manipulator of the modular robotic device is determined. At step 1910, the determined number of degrees of freedom is provided or used to generate a recommended robotic manipulator configuration including a number of rigid segments to be used and types of joint portions to be used. At step 1912, steps determined to command the recommended robotic manipulator configuration through the plurality of states is generated or provided for use by an actual robot device configured in accordance with the recommended robotic manipulator configuration. At step 1914, the method 1900 ends. The method 1900 is exemplary, a number of additional or alternative steps are envisioned, and the disclosure is not intended be limited to the particular examples provided herein.

While the best modes for carrying out the disclosure have been described in detail, those familiar with the art to which this disclosure relates will recognize various alternative designs and embodiments for practicing the disclosure within the scope of the appended claims.

What is claimed is:

1. A modular robotic device, comprising:
   a computerized processor, operating programming to:
   monitor geometry and restraints describing a workpiece and operations to be performed upon the workpiece;
   determine a plurality of states through which the modular robotic device is to be moved to accomplish the operations to be performed based upon the monitored geometry and restraints;
   analyze the plurality of states to determine a minimum number of degrees of freedom in a robotic manipulator of the modular robotic device; and
   generate a recommended robotic manipulator configuration including a plurality of modular rigid segments to be used and types of joint portions to be used;
   a robot base; and
   a robotic manipulator connected to the robot base and operable to articulate a tool device connected to an end of the robotic manipulator, wherein the robotic manipulator is configured according to the recommended robotic manipulator configuration.

2. The modular robotic device of claim 1, wherein the plurality of modular rigid segments includes:
   a first rigid segment including a first joint portion;
   a second rigid segment connected to the first joint portion and including a second joint portion connected to the second rigid segment;
   a third rigid segment connected to the second joint portion and including a third joint portion connected to the third rigid segment;
   a fourth rigid segment connected to the third joint portion and including a fourth joint portion connected to the fourth rigid segment;
   a fifth rigid segment connected to the fourth joint portion and including a fifth joint portion connected to the fifth rigid segment;
   a sixth rigid segment connected to the fifth joint portion and including a sixth joint portion connected to the sixth rigid segment; and
   a seventh rigid segment connected to the sixth joint portion.

3. The modular robotic device of claim 1, wherein each of the plurality of modular rigid segments includes a connection cable operable to transmit one of data and power through the modular rigid segment.

4. The modular robotic device of claim 1, wherein each of the plurality of modular rigid segments includes a plurality of connection cables operable to transmit data and power through the modular rigid segment.

5. The modular robotic device of claim 1, wherein each of the plurality of modular rigid segments includes a joint portion; and
   wherein at least one of the joint portions is operable to change an angle of a longitudinal axis of a first of the plurality of modular rigid segments with respect to a longitudinal axis of a second of the plurality of modular rigid segments.

6. The modular robotic device of claim 1, wherein each of the plurality of modular rigid segments includes a joint portion; and
   wherein at least one of the joint portions is operable to rotate a first of the plurality of modular rigid segments with respect to a second of the plurality of modular rigid segments while maintaining a common longitudinal axis between the first of the plurality of modular rigid segments and the second of the plurality of modular rigid segments.

7. The modular robotic device of claim 1, wherein the robot base is mobile and operable to move alongside a moving workpiece upon which the modular robotic device is operable to perform work such that the robotic manipulator performs a task upon the moving workpiece.

8. The modular robotic device of claim 1, wherein determining the plurality of states through which the modular robotic device is to be moved includes defining an initial state, one or more intermediate states, and a final state through which the robotic manipulator will transition to complete the operations upon the workpiece.

9. A method to operate a modular robotic device, comprising:
   within a computerized processor, operating programming to:
   monitor geometry and restraints describing a workpiece and operations to be performed upon the workpiece;
   determine a plurality of states through which the modular robotic device is to be moved to accomplish the operations to be performed based upon the monitored geometry and restraints;
   analyze the plurality of states to determine a minimum number of degrees of freedom in a robotic manipulator of the modular robotic device; and
   generate a recommended robotic manipulator configuration including a number of rigid segments to be used and types of joint portions to be used.

10. The method of claim 9, further comprising:
    assembling a plurality of modular rigid segments, each of the plurality of modular rigid segments including a joint portion, to a robot base based upon the recommended robotic manipulator configuration.

11. The method of claim 9, wherein monitoring geometry and restraints describing the workpiece and operations to be performed upon the workpiece includes monitoring operation of a mobile robot base and corresponding movement of the workpiece.

12. The method of claim 9, wherein generating the recommended robotic manipulator configuration including types of joint portions to be used includes determining operations including bending of a robotic manipulator of the modular robotic device and determining operations including rotating of the robotic manipulator.

* * * * *